United States Patent
Triplett (10) Patent No.: US 8,195,893 B2
(45) Date of Patent: *Jun. 5, 2012

(54) ELIMINATING SYNCHRONOUS GRACE PERIOD DETECTION FOR NON-PREEMPTIBLE READ-COPY UPDATE ON UNIPROCESSOR SYSTEMS

(75) Inventor: Joshua A. Triplett, Hillsboro, OR (US)

(73) Assignee: International Business Machines Corporation, Armonk, NY (US)

( * ) Notice: Subject to any disclaimer, the term of this patent is extended or adjusted under 35 U.S.C. 154(b) by 751 days.

This patent is subject to a terminal disclaimer.

(21) Appl. No.: 12/263,613

(22) Filed: Nov. 3, 2008

(65) Prior Publication Data

US 2010/0115235 A1 May 6, 2010

(51) Int. Cl.
 *G06F 12/00* (2006.01)
(52) U.S. Cl. .............. 711/147; 711/154; 711/E12.036; 707/689
(58) Field of Classification Search .................. None
 See application file for complete search history.

(56) References Cited

U.S. PATENT DOCUMENTS

| | | | |
|---|---|---|---|
| 5,241,673 A | 8/1993 | Schelvis | |
| 5,442,758 A | 8/1995 | Slingwine et al. | |
| 5,608,893 A | 3/1997 | Slingwine et al. | |
| 5,727,209 A | 3/1998 | Slingwine et al. | |
| 6,219,690 B1 | 4/2001 | Slingwine et al. | |
| 6,886,162 B1 | 4/2005 | McKenney | |
| 6,996,812 B2 | 2/2006 | McKenney | |
| 7,287,135 B2 | 10/2007 | McKenney et al. | |
| 7,353,346 B2 | 4/2008 | McKenney et al. | |
| 7,953,708 B2 * | 5/2011 | McKenney et al. ........... 707/689 |
| 2005/0149634 A1 | 7/2005 | McKenney | |
| 2005/0198030 A1 | 9/2005 | McKenney | |
| 2006/0100996 A1 | 5/2006 | McKenney | |
| 2006/0112121 A1 | 5/2006 | McKenney et al. | |
| 2006/0117072 A1 | 6/2006 | McKenney | |
| 2006/0123100 A1 | 6/2006 | McKenney | |
| 2006/0130061 A1 | 6/2006 | McKenney | |
| 2006/0265373 A1 | 11/2006 | McKenney et al. | |
| 2007/0083565 A1 | 4/2007 | McKenney | |
| 2007/0101071 A1 | 5/2007 | McKenney | |
| 2007/0198520 A1 | 8/2007 | McKenney | |

(Continued)

OTHER PUBLICATIONS

J. Seigh, "RCU + SMR for preemptive kernel/user threads," Linux Kernel Mailing List, May 9, 2005, 2 pages.

(Continued)

*Primary Examiner* — Reginald Bragdon
*Assistant Examiner* — Eric Loonan
(74) *Attorney, Agent, or Firm* — Walter W. Duft (57) ABSTRACT

A technique for optimizing grace period detection in a uniprocessor environment. An update operation is performed on a data element that is shared with non-preemptible readers of the data element. A call is issued to a synchronous grace period detection method. The synchronous grace period detection method performs synchronous grace period detection and returns from the call if the data processing system implements a multi-processor environment at the time of the call. The synchronous grace period detection determines the end of a grace period in which the readers have passed through a quiescent state and cannot be maintaining references to the pre-update view of the shared data. The synchronous grace period detection method returns from the call without performing grace period detection if the data processing system implements a uniprocessor environment at the time of the call.

19 Claims, 7 Drawing Sheets

U.S. PATENT DOCUMENTS

| | | |
|---|---|---|
| 2007/0226440 A1 | 9/2007 | McKenney et al. |
| 2007/0266209 A1 | 11/2007 | McKenney et al. |
| 2008/0033952 A1 | 2/2008 | McKenney et al. |
| 2008/0040720 A1 | 2/2008 | McKenney et al. |
| 2008/0082532 A1 | 4/2008 | McKenney |
| 2008/0140951 A1 | 6/2008 | McKenney et al. |
| 2008/0177742 A1 | 7/2008 | McKenney |

OTHER PUBLICATIONS

M. Michael, "Hazard Pointers: Safe Memory Reclamation for Lock-Free Objects," IEEE Transactions on Parallel and Distributed Systems, Jun. 2004, vol. 15, No. 6, pp. 491-504.

D. Sarma et al., "Making RCU Safe for Deep Sub-Millisecond Response Realtime Applications," 2004 USENIX (UseLinux track) Jun. 2004, 9 pages.

P. McKenney et al., "Scaling dcache with RCU," Linux Journal, Jan. 1, 2004, 12 pages.

P. McKenney et al., "Using RCU in the Linux 2.5 Kernel," LInux Journal, Oct. 1, 2003, 11 pages.

P. McKenney et al.,"Read-Copy Update," 2002 Ottawa Linux Symposium, Jul. 8, 2002, 28 pages.

H. Linder et al., "Scalability of the Directory Entry Cache," 2002 Ottawa Linux Symposium, Apr. 26, 2002, pp. 289-300.

P. Mckenney et al., "Read-Copy Update," 2001 Ottawa Linux symposium, Jul. 2001, 22 pages.

P. McKenney et al., "Read-Copy Update: Using Execution History to Solve Concurrency Problems," PDCS, Oct. 1998, 11 pages.

S. Dietrich et al., "Evolution of Real-Time Linux," 7th RTL Workshop, Nov. 17, 2005, 18 pages.

Molnar et al., "Realtime and Linux," 2005 Linux Kernel Summit, 8 pages, Jul. 2005.

H. Boehm, "The Space Cost of Lazy Reference Counting," ACM SIGPLAN Notices, Proceedings of the 31st ACM SIGPLAN-SIGACT Symposium on Principles of Programming Languages, POPL '04, vol. 39, Issue 1, Jan. 2004, p. 210-219.

M. Michael, "Scalable Lock-Free Dynamic Memory Allocation," ACM SIGPLAN Notices, Proceedings of the ACM SIGPLAN 2004 Conference on Programming Language Design and Implementation; PLDI '04, vol. 39, Issue 6, Jun. 2004, p. 35-46.

D. Dice et al., "Mostly Lock-Free Malloc," ACM SIGPLAN Notices, Proceedings of the 3rd International Symposium on Memory Management, ISMM '02, vol. 38, Issue 2 Supplement, Jun. 2002, p. 163-174.

J. Corbet, "Read-copy-update for realtime," LWN.net, Sep. 26, 2006, 3 pages.

"Priority Inversion," Wikipedia, Feb. 4, 2007, 3 pages.

McKenney, "Seven real-time Linux approaches (Part C)", LinuxDevices.com, Jun. 7, 2005, 13 pages.

P. McKenney, "RCU and CONFIG_PREEMPT_RT progress," Linux Kernel Mailing List, May 9, 2005, 2 pages.

O. Nesterov, QRCU: 'Quick' SRCU Implementation, Linux Kernel Mailing List, Dec. 1, 2005, 3 pages.

T. Gleixner, "High Resolution Timers/Dynamic Ticks-V2", LWN.net, Jan. 6, 2010, 6 pages.

P. Mckenney, "Sleepable RCU", LWN.net, Sep. 6, 2010, 10 pages.

O. Nesterov, "cpufreq_tsc( ) as core_initcall_sync", LKML.org, Jun. 19, 2011, 2 pages.

P. McKenney, "Using RCU in the Linux 2.5 Kernel", Kernel Korner, Jan. 3, 2010,11 pages.

M. Herlihy, "A Methodology for Implementing Highly Concurrent Data Objects," ACM Transactions on Programming Languages and Systems, vol. 15, Issue 5, Nov. 1993, pp. 745-770.

M. Michael, "Safe Memory Reclamation for Dynamic Lock-Free Objects Using Atomic Reads and Writes," Proceedings of the 21st Annual ACM Symposium on Principles of Distributed Computing, Jul. 2002, 10 pages.

N. Barghouti et al, "Concurrency Control in Advanced Database Operations," Jan. 1994, 83 pages.

P. McKenney, "Exploiting Deferred Destruction: An Analysis of Read-Copy-Update Techniques in Operating System Kernels," OGI School of School of Science & Engineering at Oregon Health & Science University, Jul. 2004, pp. 1-380.

P. McKenney et al., "Extending RCU for Realtime and Embedded Workloads," 2006 Ottawa Linux Symposium, Aug. 11, 2006, 15 pages.

P. McKenney, "The design of preemptible read-copy-update," LWN.net, Oct. 8, 2007, 27 pages.

D. Guniguntala et al., "The read-copy-update mechanism for supporting real-time applications on shared-memory multiprocessor systems with Linux," IBM Systems Journal, vol. 47, No. 2, May 2, 2008, pp. 221-236.

P. McKenney, "RCU vs. Locking Performance on Different CPUs," 2004 Linux.conf.au, 2004 (month of publication unknown and not in issue due to year of publication being sufficiently earlier than application effective filing date of Nov. 3, 2008), 18 pages.

B. Gamsa, "Tornado: Maximizing Locality and Concurrency in a Shared Memory Multiprocessor Operating System," 1999 (month of publication unknown and not in issue due to year of publication being sufficiently earlier than application effective filing date of Nov. 3, 2008), 14 pages.

A. Kleen, "How to do nothing efficiently or better laziness: No Idle tick on x86-64", 2005 (month of publication unknown and not in issue due to year of publication being sufficiently earlier than application effective filed of Nov. 3, 2008), 16 pages.

P. McKenney, "Read-Copy Update Implementations", 2001 (month of publication unknown and not in issue due to year of publication being sufficiently earlier than application effective filed of Nov. 3, 2008), 3 pages.

* cited by examiner

FIG. 10 ns and
methods in which data resources are shared among concurrent data consumers while preserving data integrity and consistency relative to each consumer. More particularly, the invention concerns an implementation of a mutual exclusion mechanism known as "read-copy update" in a uniprocessor computing environment.

2. Description of the Prior Art

By way of background, read-copy update is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to multiprocessor computing environments in which the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of operations that may be currently referencing the data. The other view is the new (post-update) data state that is available for the benefit of operations that access the data following the update. In the second (deferred update) phase, the old data state is removed following a "grace period" that is long enough to ensure that all executing operations will no longer maintain references to the pre-update data. The second-phase update operation typically comprises freeing a stale data element. In certain RCU implementations, the second-phase update operation may comprise something else, such as changing an operational state according to the first-phase update.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables.

Figure 1A:
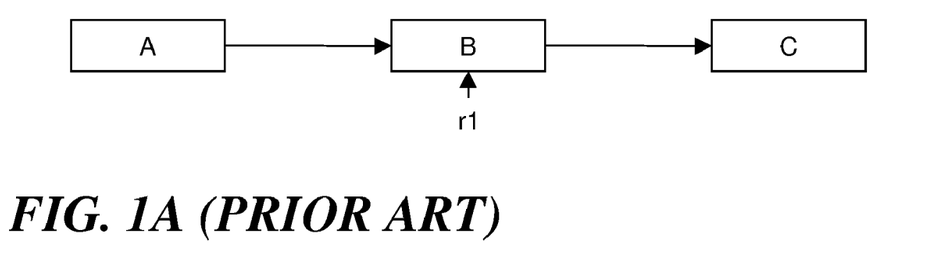
FIGS. 1A-1D are diagrammatic representations of a linked list of data elements undergoing a data element replacement according to a conventional read-copy update mechanism.
Figure 1B:
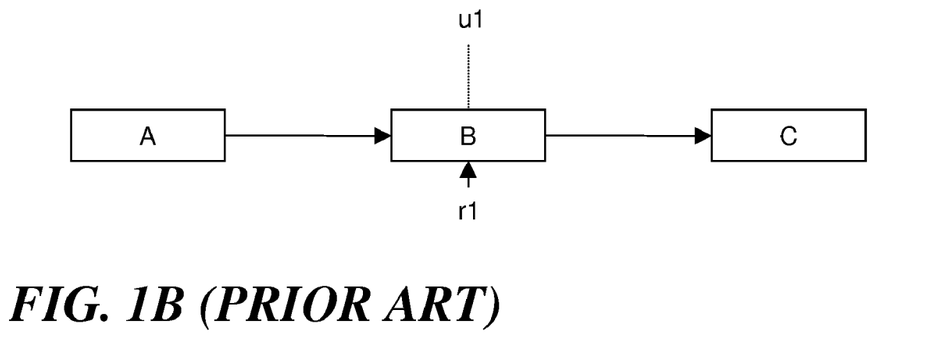
Figure 1C:
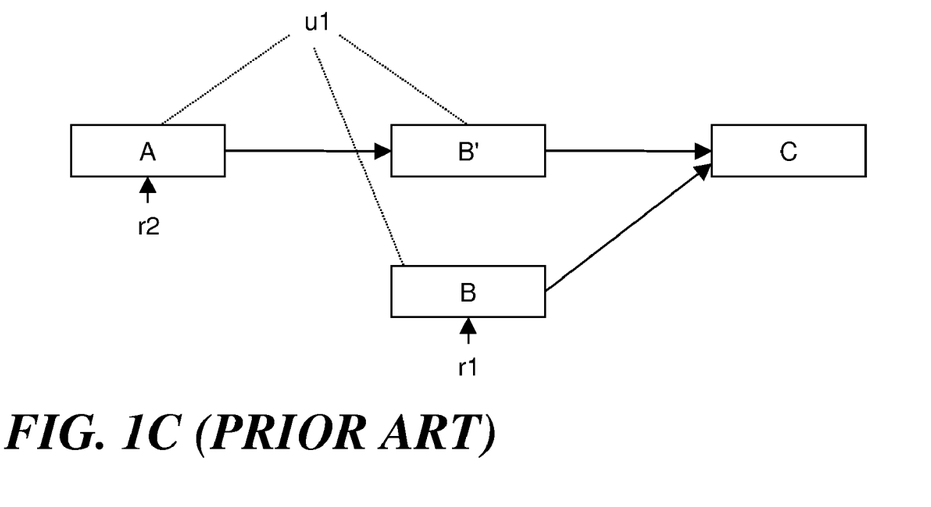

It is assumed that the data element list of FIGS. 1A-1D is traversed (without locking) by multiple concurrent readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This is done by u1 acquiring an appropriate lock, allocating new memory for B', copying the contents of B to B', modifying B' as needed, updating the pointer from A to B so that it points to B', and releasing the lock. All subsequent (post update) readers that traverse the linked list, such as the reader r2, will see the effect of the update operation by encountering B'. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays.

Figure 1D:
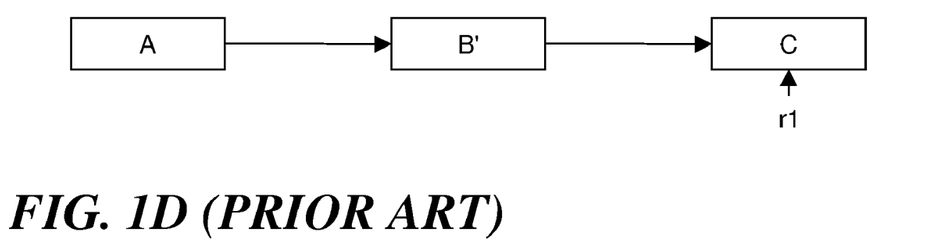

At some subsequent time following the update, r1 will have continued its traversal of the linked list and moved its reference off of B. In addition, there will be a time at which no other reader process is entitled to access B. It is at this point, representing expiration of the grace period referred to above, that u1 can free B, as shown in FIG. 1D.

Figure 2A:
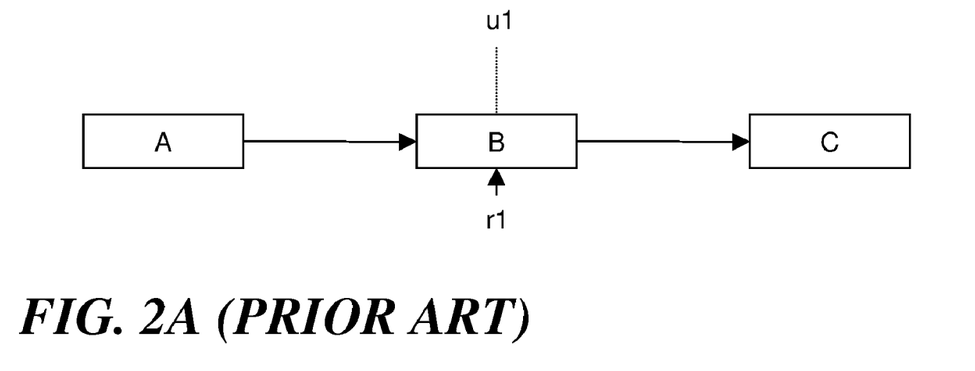
FIGS. 2A-2C are diagrammatic representations of a linked list of data elements undergoing a data element deletion according to a conventional read-copy update mechanism.
Figure 2B:
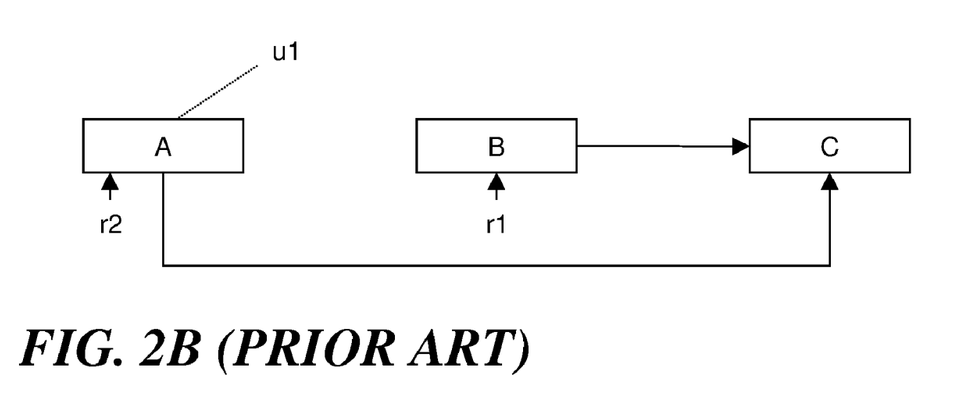
Figure 2C:
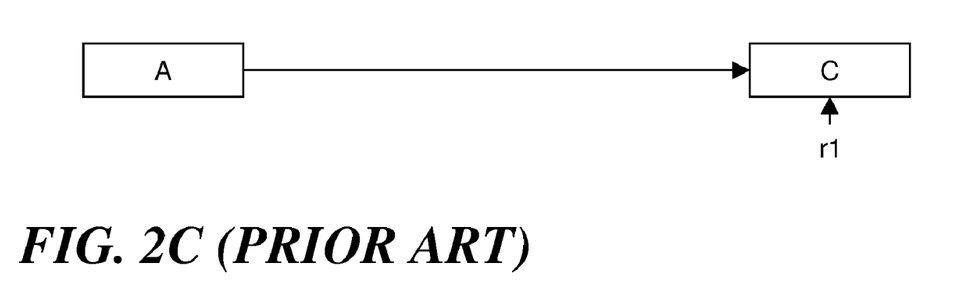

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following expiration of the grace period.

In the context of the read-copy update mechanism, a grace period represents the point at which all running processes having access to a data element guarded by read-copy update have passed through a "quiescent state" in which they can no longer maintain references to the data element, assert locks thereon, or make any assumptions about data element state. By convention, for operating system kernel code paths, a context (process) switch, an idle loop, and user mode execution all represent quiescent states for any given CPU (as can other operations that will not be listed here).

Figure 3:
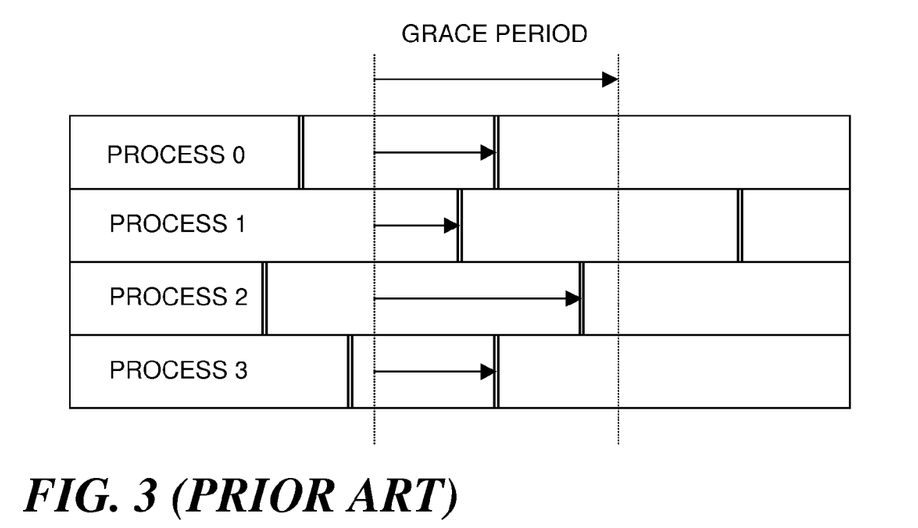
FIG. 3 is a flow diagram illustrating a grace period in which four processes pass through a quiescent state.

In FIG. 3, four processes 0, 1, 2, and 3 running on four separate CPUs are shown to pass periodically through quiescent states (represented by the double vertical bars). The grace period (shown by the dotted vertical lines) encompasses the time frame in which all four processes have passed through one quiescent state. If the four processes 0, 1, 2, and 3 were reader processes traversing the linked lists of FIGS. 1A-1D or FIGS. 2A-2C, none of these processes having reference to the old data element B prior to the grace period could maintain a reference thereto following the grace period. All post grace period searches conducted by these processes would bypass B by following the links inserted by the updater.

There are various methods that may be used to implement a deferred data update following a grace period. One technique is to accumulate deferred update requests as callbacks (e.g., on callback lists), then perform batch callback processing at the end of the grace period. This represents asynchronous grace period processing. Updaters can perform first phase updates, issue callback requests, then resume operations with the knowledge that their callbacks will eventually be processed at the end of a grace period. Another commonly used technique is to have updaters perform first phase updates, block (wait) until a grace period has completed, and then resume to perform the deferred updates. This represents synchronous grace period processing.

Read-copy update has been used in production for many years in various operating system kernel environments, including the Linux® kernel. In non-preemptible kernels, grace period detection processing can be performed by observing natural quiescent states (e.g., context switch, user mode or idle loop) or by inducing such states (e.g., by forcing a context switch). Although non-preemptible RCU is commonly used in multiprocessor environments, it may also be used in uniprocessor environments. For example, many small embedded real-time systems are still uniprocessor systems. Such systems can often benefit from RCU (e.g., when critical section code can be executed from both process as well as interrupt context), and thus may utilize preemptible RCU as an alternative to other mutual exclusion mechanisms. However, applicants have determined that the existing grace period detection methods used by some implementations of non-preemptible RCU may not be optimal for uniprocessor environments.

SUMMARY OF THE INVENTION

A technique is provided for optimizing grace period detection in a uniprocessor environment. An update operation is performed on a data element that is shared with non-preemptible readers of the data element. A call is issued to a synchronous grace period detection method. The synchronous grace period detection method performs synchronous grace period detection and returns from the call if the data processing system implements a multi-processor environment at the time of the call. The synchronous grace period detection determines the end of a grace period in which the readers have passed through a quiescent state and cannot be maintaining references to the pre-update view of the shared data. The synchronous grace period detection method returns from the call without performing grace period detection if the data processing system implements a uniprocessor environment at the time of the call.

BRIEF DESCRIPTION OF THE DRAWINGS

The foregoing and other features and advantages of the invention will be apparent from the following more particular description of example embodiments, as illustrated in the accompanying Drawings, in which.

DETAILED DESCRIPTION OF EXAMPLE EMBODIMENTS

Figure 4:
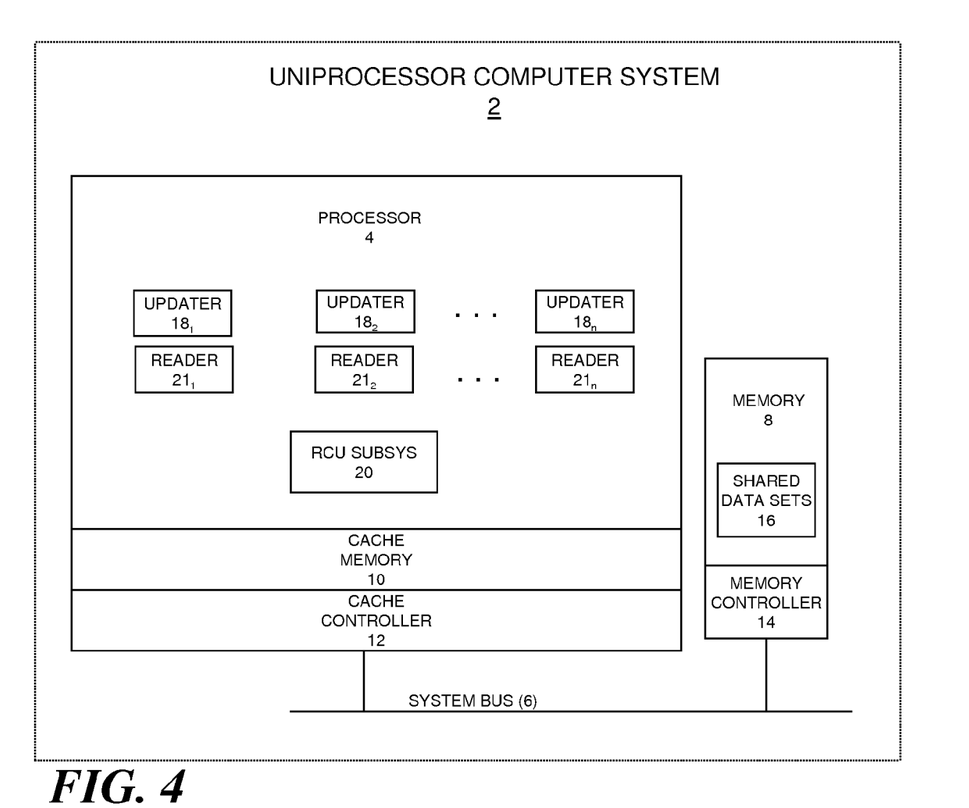
FIG. 4 is a functional block diagram showing a computing system that represents an example environment that may be used for optimizing preemptible RCU grace period detection for uniprocessor operation.
Figure 5:
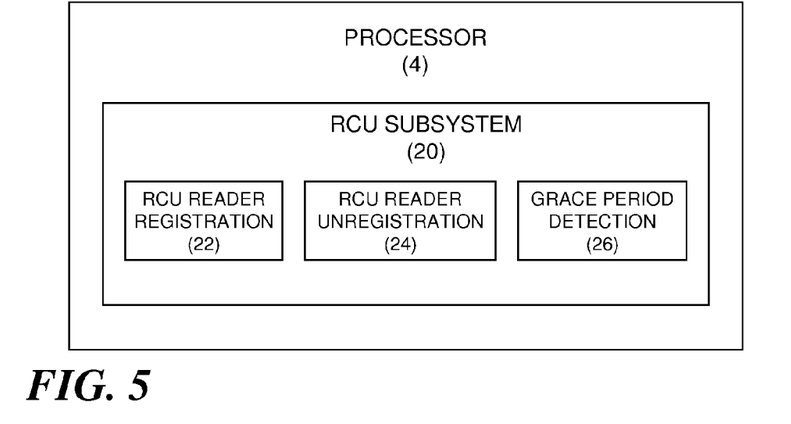
FIG. 5 is a functional block diagram showing a read-copy update subsystem implemented in the computing system of FIG. 4.

Turning now to the figures, wherein like reference numerals represent like elements in all of the several views, FIG. 4 illustrates an example computing environment in which the disclosed technique may be implemented. In particular, a uniprocessor computing system 2 is shown in which a processor 4 is connected by way of a system bus 6 to a memory 8. A conventional cache memory 10 and a cache controller 12 are associated with the processor 4. A conventional memory controller 14 is associated with the memory 8.

Update operations executed within kernel-level or user-level processes, threads or other execution contexts periodically perform updates on a set of shared data 16 stored in the memory 8. Reference numerals $18_1$, $18_2$ ... $18_n$ illustrate individual update operations (updaters) that may periodically execute on the processor 4. As described by way of background above, the updates performed by the data updaters $18_1$, $18_2$ ... $18_n$ can include modifying elements of a linked list, inserting new elements into the list, deleting elements from the list, and many other types of operations (involving lists or other data structures). To facilitate such updates, the processor 4 is programmed to implement a read-copy update (RCU) subsystem 20 as part of its kernel-level or user-level functions. The processor 4 also periodically executes kernel-level or user-level read operations (readers) $21_1$, $21_2$ ... $21_n$ that access the shared data 16 for reading. Such read operations will typically be performed far more often than updates, insofar as this is one of the premises underlying the use of read-copy update. For purposes of the present disclosure, the readers $21_1$, $21_2$ ... $21_n$ are assumed to be non-preemptible. This may be because reader preemption is not supported at all, or because preemption has been temporarily disabled during RCU read-side critical section processing.

The RCU subsystem 20 is implemented in the environment of FIG. 4 using one or more logic components that implement RCU-related primitives (methods). Two optional components that may be provided are an RCU reader registration component 22 and an RCU reader unregistration component 24. These components can be respectively called by the readers $21_1$, $21_2$ ... $21_n$ when they enter and leave RCU-protected critical sections. The RCU primitives "rcu_read_lock( )" and "rcu_read_unlock( )" found in current versions of the Linux® kernel are examples of logic that may be used to respectively implement the RCU reader registration and unregistration components 22 and 24. If reader preemption is not supported, the rcu_read_lock( ) and rcu_read_unlock( ) primitives do not incur any processing overhead. They simply demarcate the beginning and end of the RCU-protected critical sections. If reader preemption is supported, the rcu read lock( ) and rcu read unlock( ) primitives respectively disable preemption and reenable preemption.

The RCU subsystem further includes a grace period detection component 26 that allows the updaters $18_1, 18_2 \ldots 18_n$ to request asynchronous grace period detection or synchronous grace period detection following an update to a shared data element. As described in the "Background" section above, asynchronous grace period detection accumulates deferred update requests as callbacks (e.g., on callback lists), then performs batch callback processing at the end of the grace period. The updaters $18_1, 18_2 \ldots 18_n$ can perform first phase updates, issue callback requests, then resume operations with the knowledge that their callbacks will eventually be processed at the end of a grace period. The RCU primitive "call_rcu( )" in current versions of the Linux® kernel is one example of an asynchronous grace period detection method that may be implemented by the grace period detection component 22. The call_rcu( ) primitive will wait for the readers $21_1, 21_2 \ldots 21_n$ to leave their RCU-protected critical sections (as demarcated by rcu_read_unlock( )), then process callbacks that are ripe for processing.

Synchronous grace period detection differs from asynchronous grace period detection in that updaters $18_1, 18_2 \ldots 18_n$ perform first phase updates, then block (wait) until a grace period has completed, and thereafter resume to perform the deferred updates themselves. The RCU primitive "synchronize_rcu( )" in current versions of the Linux® kernel is one example of a synchronous grace period detection method that may be implemented by the grace period detection component 22. The synchronize_rcu( ) primitive will wait for the readers $21_1, 21_2 \ldots 21_n$ to leave their RCU-protected critical sections (as demarcated by rcu_read_unlock( )), then return to the updater that invoked the primitive.

By convention, synchronous grace period detection may not be called from non-preemptible code. For example, non-preemptible RCU readers may not perform update operations that rely on synchronous grace period detection inside of RCU-protected critical sections. Using synchronous grace period detection in this case would result in deadlock because the update code invoked by the reader would wait for the reader to complete, which it never will. Nor can such synchronous grace period detection be used for update operations performed within hardware interrupt handlers or software interrupt handlers. Such handlers are not allowed to block.

The foregoing means that when synchronous grace period detection begins, it may be assumed that no non-preemptible RCU-protected critical section will be capable of running on the same processor. In a uniprocessor environment, synchronous grace period detection need not wait at all for non-preemptible readers to complete RCU-protected critical sections. There will be no such readers. Applicants have thus determined that grace period detection may be conditioned on whether a call for synchronous grace period detection has been made in a uniprocessor environment running non-preemptible RCU readers. If this condition prevails, grace period detection may be bypassed. Grace period detection need only be performed to protect non-preemptible readers if asynchronous grace period detection is requested or if synchronous grace period detection is requested in a multi-processor environment.

Figure 6:
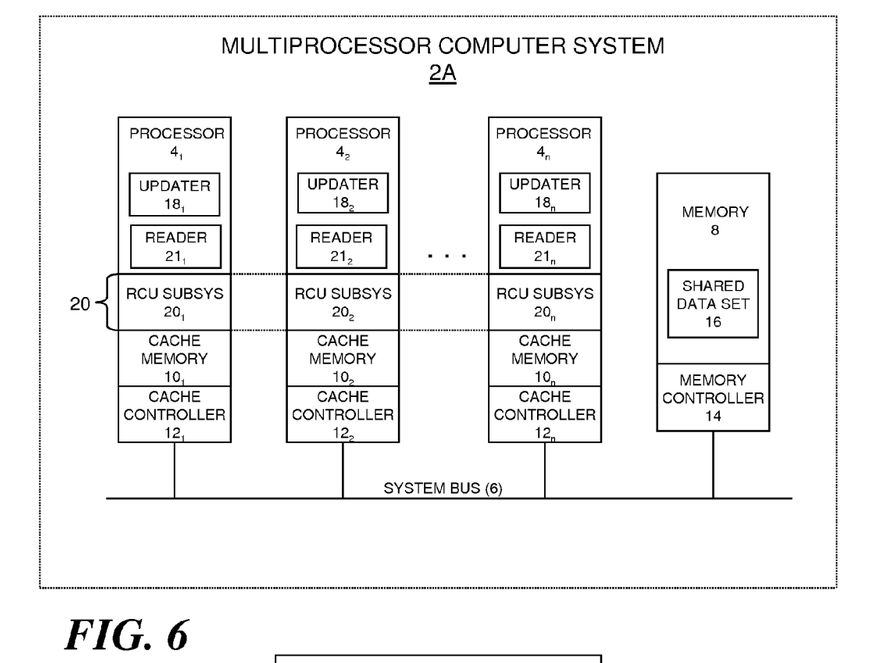
FIG. 6 is a functional block diagram showing another computing system that represents an alternative example environment that may be used for optimizing preemptible RCU grace period detection for uniprocessor operation.

The system 2 of FIG. 4 represents one uniprocessor environment wherein it may be safe to bypass grace period detection. Another example would be a multiprocessor environment in which only one processor is active and capable of running any of the readers $21_1, 21_2 \ldots 21_n$ (e.g., a system with hot-pluggable CPUs). An example of this is illustrated in FIG. 6 by the hot-pluggable multiprocessor system 2A. In this system, there are multiple processors $4_1, 4_2 \ldots 4_n$ with associated cache memories $10_1, 10_2 \ldots 10_n$ and cache $12_1, 12_2 \ldots 12_n$. The RCU subsystem 20 may be distributed over the processors $4_1, 4_2 \ldots 4_n$ as RCU subsystem instances $20_1, 20_2 \ldots 20_n$. Because the system 2A can be placed in a state where all but one of the processors $4_1, 4_2 \ldots 4_n$ is inactive (effectively becoming a uniprocessor system), the conditional grace period detection technique described herein may be used.

Grace period detection processing for uniprocessor environments running non-preemptible readers may be conditioned in a variety of ways. One technique would be to set the synchronize grace period detection condition statically at compile time by conditionally compiling the RCU subsystem based on a multiprocessor vs. uniprocessor compiler preprocessor directive. In Linux®, the condition could be based on having the CONFIG_SMP kernel configuration (Kconfig) option enabled and the corresponding C preprocessor symbol defined. A Linux® kernel built for uniprocessor operation only will have CONFIG_SMP disabled and the corresponding C preprocessor directive symbol not defined. Thus, a non-preemptible RCU implementation in the Linux® kernel can decide at compilation time how to define the synchronous grace period detection primitive based on whether the target configuration of the kernel supports multiprocessor systems. Example preprocessor directive pseudo code based on the synchronize_rcu( ) primitive could be implemented as follows:

```
#ifdef CONFIG_SMP
void synchronize_rcu(void)
{
    struct rcu_synchronize rcu;
    init_completion(&rcu.completion);
    /* Will wake me after RCU finished */
    call_rcu(&rcu.head, wakeme_after_rcu);
    /* Wait for it */
    wait_for_completion(&rcu.competion);
}
#else
void synchronize_rcu (void) { }
#endif
```

In this case, the synchronize_rcu( ) primitive performs conventional synchronous grace period detection if the CONFIG_SMP option is enabled. Otherwise, synchronize_rcu( ) returns without performing grace period detection. In some cases, synchronize_rcu( ) could return without performing any processing at all. In other cases, it may be desirable to perform minimal housekeeping processing, such as executing one or more instructions to prevent reordering of the call to synchronize_rcu( ) with another instruction (e.g., an instruction pertaining to a data element update performed by the updater $18_1, 18_2 \ldots 18_n$ that called for synchronous grace period detection).

Figure 7:
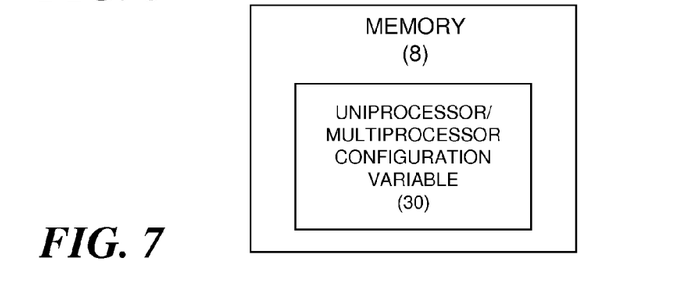
FIG. 7 is a functional block diagram showing a system configuration variable that may be used for optimizing preemptible RCU grace period detection for uniprocessor operation.

Another technique for conditioning grace period detection processing would be to set the grace period condition dynamically at run time. This could be done by consulting system configuration information provided at compile time, at boot time or at run time. For example, as shown in FIG. 7, a system configuration variable 30 could be defined at compile time to indicate either a uniprocessor or multiprocessor configuration. Example pseudocode using preprocessor directives could be implemented as follows:

```
Static const int config_smp =
#ifdef CONFIG_SMP
    1;
#else
    0;
#endif
```

As can be seen, the config_smp configuration variable 30 will be defined as 1 for multiprocessor code compilations and 0 for uniprocessor compilations. At run time, the config_smp variable can be tested to condition grace period detection according to the appropriate system configuration. For example, if config_smp=1, the conventional synchronize_rcu( ) primitive could be implemented as per the pseudocode above. If config_smp=0, the alternative synchronize_rcu( ) primitive of the pseudocode could be implemented.

Still another technique for dynamically conditioning grace period detection processing would be to select the grace period detection according to a kernel boot parameter passed at boot time. The kernel initialization code could set the configuration variable 30 (such as config_smp above) according a boot parameter that indicates whether or not uniprocessor or multiprocessor grace period detection processing is to be used by the RCU subsystem 20. As in the example given in the preceding paragraph, the RCU subsystem 20 would then be programmed to inspect the configuration variable 30 in order to dynamically determine whether uniprocessor-mode or multiprocessor-mode grace period detection is to be used.

Still another technique for dynamically conditioning grace period detection processing would be to set the configuration variable 30 according to the current number of active processors. In a hotpluggable environment such the system 2A of FIG. 6, the number of online processors may be readily determined from the operating system kernel. For example, if the RCU subsystem 20 is implemented in a Linux® kernel, it may call the existing "num_online_cpus( )" function to dynamically determine whether the system is currently operating as a uniprocessor or multiprocessor system. Other techniques may be used if the RCU subsystem 20 is implemented in user space. Once the number of processors is determined, the configuration variable 30 (such as config_smp above) may be set to specify the environment (uniprocessor or multiprocessor). Alternatively, because the configuration variable 30 is not really needed in this case, the RCU subsystem 20 could simply set its grace period detection by direct evaluation of the number of processors (e.g., using the results returned by the num_online_cpus( ) function).

Figure 8:
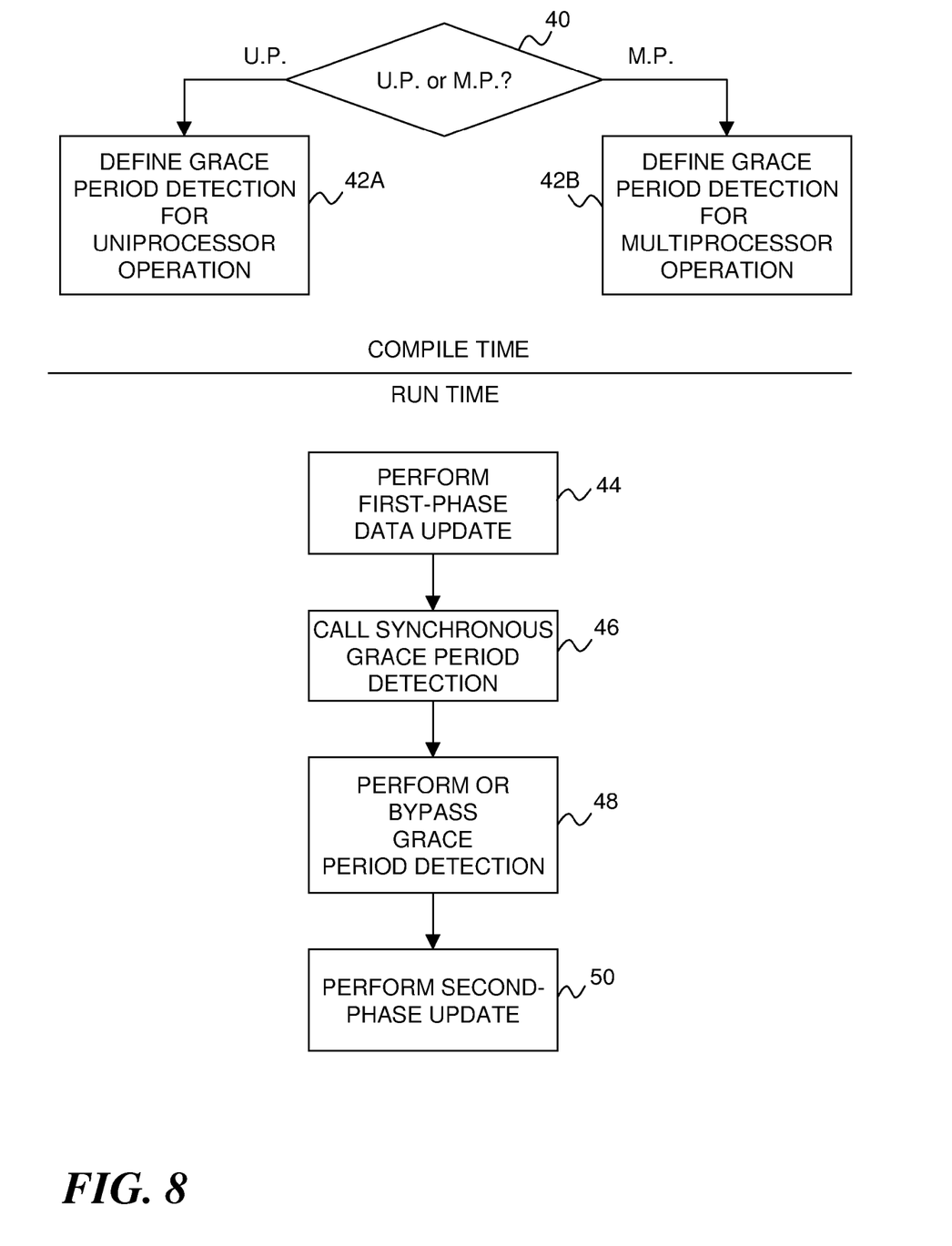
FIG. 8 is a flow diagram showing a first example of optimizing preemptible RCU grace period detection processing in accordance with the technique disclosed herein.

Turning now to FIG. 8, example processing is shown that may be performed by the RCU subsystem 20 to statically condition grace period detection at compile time, then automatically implement the appropriate type of grace period detection at run time. The initial processing shown in blocks 40, 42A and 42B occurs at compile time. The subsequent processing shown in blocks 44-50 occurs at run time. In block 40, a compiler is instructed via a preprocessor directive to compile for either a uniprocessor or multiprocessor environment. If uniprocessor compilation is directed, block 42A is implemented and synchronous grace period detection is compiled so as to not to perform grace period detection. On the other hand, if multiprocessor compilation is directed, block 42B is implemented and synchronous grace period detection is compiled so as to perform.

During run time, an updater $18_1, 18_2 \ldots 18_n$ implements block 44 by performing an update to the shared data set 18 shown in FIGS. 4 and 6. In accordance the philosophy of RCU, this update is performed in a manner (first-phase data update) that temporarily preserves a pre-update view of the shared data for the benefit of readers that may be concurrently referencing the shared data during the update operation. In block 46, the updater calls the grace period detection component 26 of the RCU subsystem 20 to request synchronous grace period detection. In block 48, the grace period detection component 26 performs or bypasses grace period detection based on the way it was compiled in blocks 42A or 42B (i.e., according to whether the system is a uniprocessor system or a multiprocessor system). In block 50, a second-phase update operation is performed (e.g., a stale data element is freed).

Figure 9:
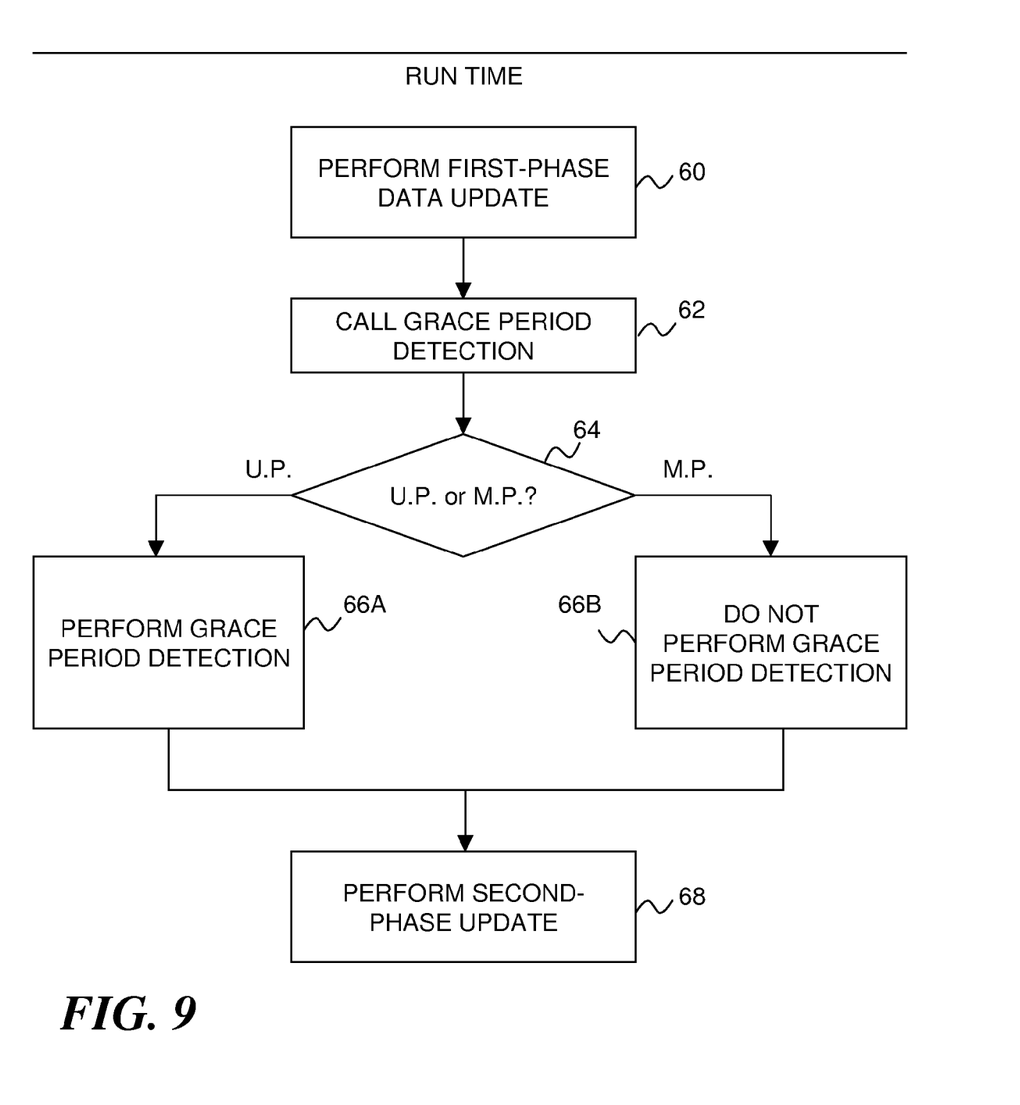
FIG. 9 is a flow diagram showing a second example of optimizing preemptible RCU grace period detection processing in accordance with the technique disclosed herein.

Turning now to FIG. 9, example processing is shown that may be performed by the RCU subsystem 20 to dynamically condition grace period detection processing at run time. In block 60, an updater $18_1, 18_2 \ldots 18_n$ performs an update to the shared data set 18 shown in FIGS. 4 and 6. In accordance the philosophy of RCU, this update is performed in a manner (first-phase data update) that temporarily preserves a pre-update view of the shared data for the benefit of readers that may be concurrently referencing the shared data during the update operation. In block 62, the updater calls the grace period detection component 26 of the RCU subsystem 20 to request synchronous grace period detection. In block 64, the grace period detection component 26 dynamically determines if the host data processing system is a uniprocessor system or a multiprocessor system. As previously discussed, three possible techniques that may be used include checking system configuration information (e.g., the configuration variable 30 of FIG. 7) provided at compile time, at boot time or at run time. If the data processing system is a uniprocessor system, the RCU subsystem 20 performs grace period detection processing in block 66A. If the data processing system is a multiprocessor system, the RCU subsystem 20 returns without performing grace period detection processing in block 66B. In block 68, a second-phase update operation is performed (e.g., a stale data element is freed).

Figure 10:
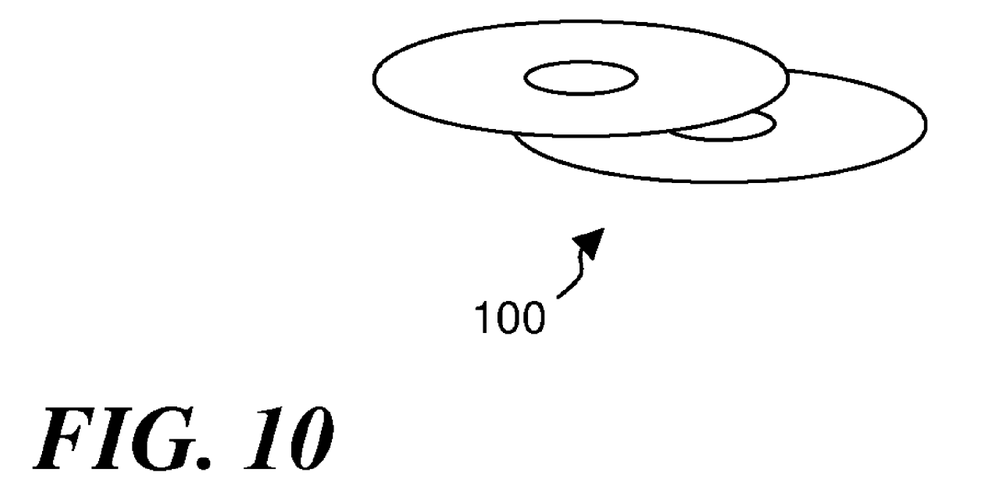
FIG. 10 is a diagrammatic illustration of media that can be used to provide a computer program product for implementing uniprocessor-optimized RCU grace period detection.

Accordingly, a grace period detection optimization technique for uniprocessor systems running non-preemptible readers has been disclosed. It will be appreciated that the foregoing concepts may be variously embodied in any of a data processing system, a machine implemented method, and a computer program product in which programming means are provided by one or more machine-readable media for use in controlling a data processing system to perform the required functions. The system and method may be implemented using a software-programmed machine, a firmware-programmed machine, hardware circuit logic, or any combination of the foregoing. For the computer program product, example machine-readable media for providing programming means are depicted by reference numeral 100 in FIG. 10. The media 100 are shown as being portable optical storage disks of the type that are conventionally used for commercial software sales, such as compact disk-read only memory (CD-ROM) disks, compact disk-read/write (CD-R/W) disks, and digital versatile disks (DVDs). Such media can store the programming means of the invention, either alone or in conjunction with another software product that incorporates the required functionality. The programming means could also be provided by portable magnetic media (such as floppy disks, flash memory sticks, etc.), or magnetic media combined with drive systems (e.g. disk drives), or media incorporated in data processing platforms, such as random access memory (RAM), read-only memory (ROM) or other semiconductor or solid state memory. More broadly, the media could comprise any electronic, magnetic, optical, electromagnetic, infrared, semiconductor system or apparatus or device, transmission or propagation medium or signal, or other entity that can contain, store, communicate, propagate or transport the programming means for use by or in connection with a data processing system, computer or other instruction execution system, apparatus or device.

While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method for use in a data processing system, comprising:
   performing an update operation on a data element that is shared with one or more non-preemptible readers of said data element;
   issuing a call to a synchronous grace period detection method;
   said synchronous grace period detection method performing synchronous grace period detection and returning from said call if said data processing system implements a multi-processor environment at a time of said call;
   said synchronous grace period detection determining an end of a grace period in which said one or more non-preemptible readers have passed through a quiescent state and cannot be maintaining references to a pre-update view of said shared data element; and
   said synchronous grace period detection method returning from said call without performing grace period detection if said data processing system implements a uniprocessor environment at the time of said call.

2. The method of claim 1, wherein said synchronous grace period detection method is configured at compile time to perform or not perform said grace period detection based on whether said synchronous grace period detection method is compiled for said multiprocessor environment or said uniprocessor environment.

3. The method of claim 1, wherein said synchronous grace period detection method is configured at run time to perform or not perform said grace period detection based on whether said synchronous grace period detection method is called in said multiprocessor environment or said uniprocessor environment.

4. The method of claim 1, wherein said synchronous grace period detection method is configured based on system configuration information provided at compile time, at boot time or at run time.

5. The method of claim 1, wherein said synchronous grace period detection method for said uniprocessor environment implements one or more instructions to prevent reordering of said call to said synchronous grace period detection method with an instruction pertaining to said update operation on said data element.

6. A data processing system, comprising:
   one or more processors;
   a memory coupled to said one or more processors, said memory including a computer useable medium tangibly embodying at least one program of instructions executable by said one or more processors to perform operations for optimizing grace period detection following a data element update operation that affects non-preemptible data readers, comprising:
   performing an update operation on a data element that is shared with one or more non-preemptible readers of said data element;
   issuing a call to a synchronous grace period detection method;
   said synchronous grace period detection method performing synchronous grace period detection and returning from said call if said data processing system implements a multi-processor environment at a time of said call;
   said synchronous grace period detection determining an end of a grace period in which said one or more non-preemptible readers have passed through a quiescent state and cannot be maintaining references to a pre-update view of said shared data element; and
   said synchronous grace period detection method returning from said call without performing grace period detection if said data processing system implements a uniprocessor environment at the time of said call.

7. The system of claim 6, wherein said uniprocessor environment is a multi-processor system having not more than one processor in an operational mode executing any of said one or more non-preemptible readers.

8. The system of claim 7, wherein said synchronous grace period detection method is configured at compile time to perform or not perform said grace period detection based on whether said synchronous grace period detection method is compiled for said multiprocessor environment or said uniprocessor environment.

9. The system of claim 6, wherein said synchronous grace period detection method is configured at run time to perform or not perform said grace period detection based on whether said synchronous grace period detection method is called in said multiprocessor environment or said uniprocessor environment.

10. The system of claim 6, wherein said synchronous grace period detection method is configured based on system configuration information provided at compile time, at boot time or at run time.

11. The system of claim 6, wherein said synchronous grace period detection method for said uniprocessor environment implements one or more instructions to prevent reordering of said call to said synchronous grace period detection method with an instruction pertaining to said update operation on said data element.

12. A computer program product, comprising:
    one or more machine-readable storage media;
    means provided by said one or more media for programming a data processing platform to optimize grace period detection following a data element update operation that affects non-preemptible data readers, as by:
    performing an update operation on a data element that is shared with one or more non-preemptible readers of said data element;
    issuing a call to a synchronous grace period detection method;
    said synchronous grace period detection method performing synchronous grace period detection and returning from said call if said data processing platform implements a multi-processor environment at a time of said call;
    said synchronous grace period detection determining an end of a grace period in which said one or more non-preemptible readers have passed through a quiescent state and cannot be maintaining references to a pre-update view of said shared data element; and
    said synchronous grace period detection method returning from said call without performing grace period detection if said data processing platform implements a uniprocessor environment at the time of said call.

13. The computer program product of claim 12, wherein said uniprocessor environment is a multi-processor system having not more than one processor in an operational mode executing any of said one or more non-preemptible readers.

14. The computer program product of claim 13, wherein said synchronous grace period detection method is configured at compile time to perform or not perform said grace period detection based on whether said synchronous grace period detection method is compiled for said multiprocessor environment or said uniprocessor environment.

15. The computer program product of claim 12, wherein said synchronous grace period detection method is configured at run time to perform or not perform said grace period detection based on whether said synchronous grace period detection method is called in said multiprocessor environment or said uniprocessor environment.

16. The computer program product of claim 12, wherein said synchronous grace period detection method is configured based on system configuration information provided at compile time, at boot time or at run time.

17. The computer program product of claim 12, wherein said synchronous grace period detection method for said uniprocessor environment implements one or more instructions to prevent reordering of said call to said synchronous grace period detection method with an instruction pertaining to said update operation on said data element.

18. A method for optimizing grace period detection following a data element update operation in a data processing system having non-preemptible readers, comprising:

performing an update operation on a data element that is shared with one or more non-preemptible readers of said data element;

issuing a call to a synchronous grace period detection method;

said synchronous grace period detection method performing synchronous grace period detection and returning from said call if said data processing system implements a multi-processor environment at a time of said call;

said synchronous grace period detection determining an end of a grace period in which said one or more non-preemptible readers have passed through a quiescent state and cannot be maintaining references to said pre-update view of said shared data;

said synchronous grace period detection method returning from said call without performing grace period detection if said data processing system implements a uniprocessor environment at the time of said call; and said uniprocessor environment being a multi-processor system having not more than one processor in an operational mode executing any of said one or more non-preemptible readers.

19. The method of claim 18, wherein said synchronous grace period detection method is configured at one of:

compile time to perform or not perform said grace period detection based on whether said synchronous grace period detection method is compiled for said multiprocessor environment or said uniprocessor environment; or run time to perform or not perform said grace period detection based on whether said synchronous grace period detection method is called in said multiprocessor environment or said uniprocessor environment.

* * * * *